United States Patent [19]

Morel, Jr. et al.

[11] Patent Number: 5,178,107
[45] Date of Patent: Jan. 12, 1993

[54] VALVE LIFTER

[76] Inventors: Edward J. Morel, Jr., 3597 Foskett Rd., Medina, Ohio 44256; Joe W. Morel, 21620 Avalon Dr., Rocky River, Ohio 44116

[21] Appl. No.: 884,903

[22] Filed: May 18, 1992

Related U.S. Application Data

[63] Continuation of Ser. No. 796,705, Nov. 21, 1991, Pat. No. 5,127,374.

[51] Int. Cl.$^5$ .............................................. F01M 9/10
[52] U.S. Cl. ................................. 123/90.35; 123/90.5
[58] Field of Search ................ 123/90.35, 90.48, 90.5; 74/569

[56] References Cited

U.S. PATENT DOCUMENTS

| | | | |
|---|---|---|---|
| 3,314,303 | 4/1967 | Maat | 123/90.5 |
| 4,361,120 | 11/1982 | Kueny | 123/90.5 |
| 4,708,102 | 11/1987 | Schmid | 123/90.35 |
| 4,793,295 | 12/1988 | Downing | 123/90.5 |
| 4,876,994 | 10/1989 | Speil et al. | 123/90.5 |
| 5,022,356 | 6/1991 | Morel, Jr. et al. | 123/90.5 |

FOREIGN PATENT DOCUMENTS 2-298610 11/1990 Japan.
2-298611 11/1990 Japan.

OTHER PUBLICATIONS

Drawing No. 41B514012 dated Jun. 2, 1970.
Drawing No. 41C613842 dated Jun. 3, 1970.

Primary Examiner—E. Rollins Cross
Assistant Examiner—Weilon Lo
Attorney, Agent, or Firm—Watts, Hoffmann, Fisher & Heinke Co.

[57] ABSTRACT

An improved pin for supporting a roller cam follower for use in an internal combustion engine block used in a high speed motor vehicle having open-ended cylindrical bores in which valve lifters reciprocate, a cam shaft with cams that reciprocate the lifters, and an engine block oil passage communicating between adjacent cylindrical bores intermediate the ends of the bores. The improved pin is cylindrical in shape and secured against rotation in two pin-receiving bores. The roller cam follower is rotatably supported on the pin. A primary oil passage for communicating with the engine block oil passage to facilitate the flow of oil between the bores is provided. The primary oil passage is displaced longitudinally from the pin and roller cam follower. A lubrication oil passage is located within the pin and has an inlet opening facing predominantly toward the primary oil passage and which is located in a portion of the pin that is in one of the pin-receiving bores of the body. The lubrication oil passage also has an outlet opening facing predominantly toward the primary oil passage and is displaced longitudinally from the inlet opening. The outlet is located in a cylindrical surface of the pin in a portion of the pin that is surrounded by the roller. A secondary oil passage extends in fluid communication between the primary oil passage and the inlet opening of the lubrication oil passage.

7 Claims, 3 Drawing Sheets

VALVE LIFTER

This is a continuation of copending application Ser. No. 07/796,705 filed on Nov. 21, 1991 now U.S. Pat. No. 5,127,374.

TECHNICAL FIELD

This invention relates to roller valve lifters for internal combustion engines and more particularly to providing lubrication to such valve lifters in high speed automotive engines.

BACKGROUND ART

Valve lifters or tappets in some internal combustion engines, especially high speed automotive engines, use rollers that ride in contact with the cams of cam shafts that operate the valve lifters; i.e., that reciprocate the lifters, which are substantially cylindrical, in cylindrical bores of the engine block. Lifters are typically aligned in a row along a cam shaft and are lubricated by a straight and common transverse oil passage that intersects the bores, either centrally or tangentially. Serial flow of oil through successive bores is facilitated by a peripheral groove in each lifter body. The portion of the body above and below the groove prevents loss of lubricating oil through the open ends of the bores in which the lifters reciprocate and extend.

With current internal combustion engines, a typical valve lifter uses needle bearings to journal a roller cam follower on a pin or axle. This type of arrangement provides a minimal amount of lubrication to the needle bearings through the typical valve lifter oil passage which intersects the bores. In engines used for high speed automobiles, such as racing automobiles, this amount of lubrication provided to the needle bearings is inadequate and leads to early failure of the needle bearings.

A prior attempt at improving the life of needle bearings in high speed automotive engines utilized a secondary oil passage. However, the outlet was merely in the general area of the needle bearings and therefore did not provide optimum lubrication to the needle bearings. Another prior attempt at improving lubrication of the needle bearings moved the opening of a secondary oil passage closer to the axle or pin associated with the roller.

Needle bearings, even when adequately lubricated, tend to fail after short use under high valve spring loads when engines are operated at high rpm—two conditions that are prevalent in high speed automotive engines. Other bearing constructions, however, have not been deemed commercially suitable for such uses, although stronger plane bearings have been used in larger low speed engines and have been lubricated with an oil passage extending into a pin or axle associated with the roller. In such a system three passages have been drilled within the pin or axle, which is made of bronze and therefore is relatively soft, making it is easy to drill lubrication passages. An axial, horizontal passage is drilled along the axis of the pin, beginning at a first end and stopping just short of an opposite end. A vertical supply passage is drilled at the opposite end and begins on an outer cylindrical surface of the pin and ends at the axial passage to form an elongated L-shape. A second horizontal passage is drilled transverse to the axial passage and opens on opposite sides of the outer cylindrical surface of the pin to provide lubrication to the bearing. The axial passage must be plugged at the first end to prevent oil from escaping. With a high speed engine, however, such a construction will not work. The soft metal of the plane-bearing axle is not suitable for the wear experienced by the bearings of a lifter in a high speed engine. In addition, in a high speed engine the components of the engine, and therefore the valve lifters themselves, are much smaller. Therefore, in addition to having to drill down a small lifter body in order to drill the oil passage to communicate with the pin, one must also attempt to distribute the oil to the bearing surface, which is a more formidable task with a small bearing pin of hard wear-resistant metal, as would be required for this type of use.

DISCLOSURE OF THE INVENTION

The present invention overcomes the various problems associated with providing a roller and bearing of high strength and long life for valve lifters used in high speed automotive engines. The invention provides a cam lifter having a strong, relatively hard, wear-resistant, plane bearing for the roller cam follower of the lifter with a simple-to-drill lubrication system within both the valve lifter body and within a bearing pin of hard, high strength metal alloy that supports the roller cam follower.

The valve lifter of this invention is utilized within an internal combustion engine block used in a high speed motor vehicle. The block has open-ended cylindrical bores in which valve lifters reciprocate, a cam shaft with cams that reciprocate the lifters, and an engine block oil passage communicating between adjacent cylindrical bores intermediate the ends of the bores. The improved valve lifter has an elongated body for reciprocation within the bore. The elongated body has a recess in one end, two pin-receiving bores on opposite sides of the recess, and a cylindrical pin secured against rotation in the pin-receiving bores and extending through the recess. A roller cam follower is rotatably supported in the recess on the pin. A primary transverse oil passage is provided in the body for communicating with the engine block oil passage to facilitate the flow of oil between the valve lifter bores. The primary oil passage is displaced longitudinally from the pin and roller cam follower. A lubrication oil passage is located within the pin and has an inlet opening facing predominantly toward the primary oil passage and which is located in a portion of the pin that is in one of the pin-receiving bores of the body. The lubrication oil passage also has an outlet opening facing predominantly toward the primary oil passage and is displaced longitudinally from the inlet opening. The outlet is located in a cylindrical surface of the pin in a portion of the pin that is surrounded by the roller. A secondary oil passage extends in fluid communication between the primary oil passage and the inlet opening of the lubrication oil passage.

Most advantageously, the outlet of the lubrication oil passage in the pin is positioned to open toward the end of the lifter opposite from the recess to introduce lubricant where a clearance gap between the plane bearing and pin is greatest as the lifter is driven by its operating cam to open an engine valve. Most advantageously, the lubrication passage is V-shaped.

During operation of the engine, oil is supplied through the primary oil passage of the lifter and a portion flows through the secondary oil passage to the lubrication oil passage in the pin. The shape and location of the lubrication oil passage take advantage of the clearance gap between the pin and plane bearing to provide ample lubrication to the plane bearing of the roller with only a single outlet. The simple design of the passages within the axle and lifter body allow the passages to be drilled within the hard material of the axle and lifter body easily and economically. As a result, the high strength of the plane bearing and the low friction attained through the lubrication system greatly reduces wear and failure, extending the life of the lifter well beyond that experienced with presently available lifters used in high speed automotive engines.

In its broader aspects, the improved valve lifter has a primary oil passage which communicates with the engine block oil passage to facilitate the flow of oil between adjacent bores. A pin made of a high strength metal alloy is mounted within two pin-receiving bores located on opposite sides of a roller-receiving recess in one end of the valve lifter. A lubrication oil passage is drilled within the pin. The lubrication oil passage has an inlet opening facing predominantly toward the primary oil passage and located in a portion of the pin that is received in one of the pin-receiving bores. The lubrication oil passage also has an outlet opening facing predominantly toward the primary oil passage and displaced longitudinally from the inlet opening. The outlet is located in a cylindrical surface of the pin in a portion of the pin that is surrounded by a roller cam follower. A secondary oil passage in a leg of the lifter body extends in fluid communication between the primary oil passage and the inlet opening of the lubrication oil passage.

The above and other features of the invention will be better understood from the detailed description that follows, when considered in connection with the accompanying drawings.

BEST MODE FOR CARRYING OUT THE INVENTION

Figure 1:
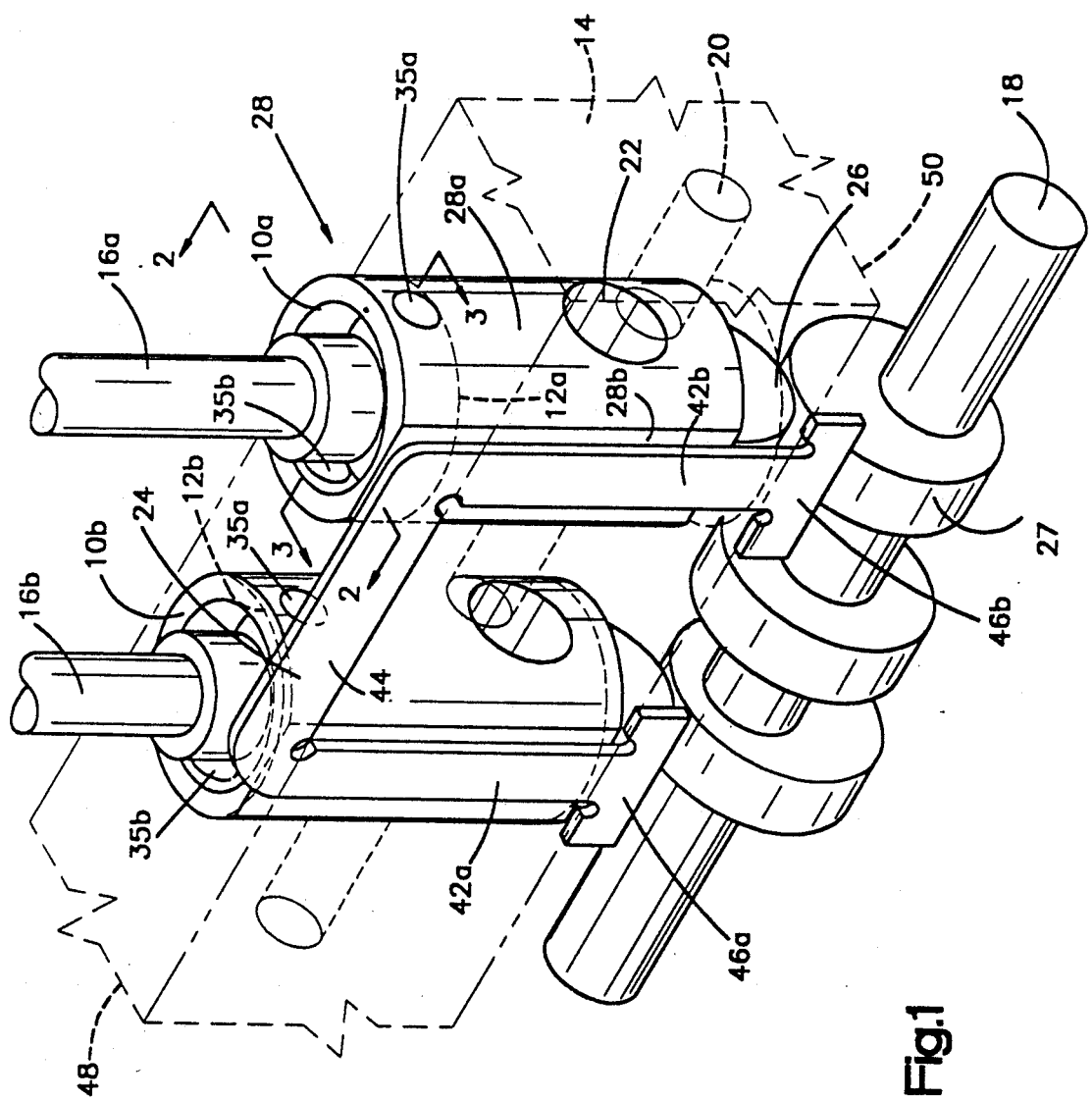
FIG. 1 is a partial diagrammatic isometric view of the preferred embodiment of an engine block.

With reference to the accompanying drawings, roller valve lifters 10a, 10b are shown received in open-ended cylindrical bores 12a, 12b of an internal combustion engine block 14. In the embodiment shown, each cylinder (not shown) of the block has two valves and the lifters 10a, 10b operate push rods 16a, 16b in response to rotation of a cam shaft 18 to control opening and closing of the valves for one of the engine cylinders. Additional bores and lifters are provided in the block aligned with the cam shaft for operating the valves of additional cylinders, as is conventional. An oil passage 20 parallel to the cam shaft is formed in the block and intersects the bores 12a, 12b and successive bores associated with additional cylinders. In the embodiment shown, the oil passage intersects the bores intermediate the open-ends and centrally, but in some engines the passage will intersect the bores tangentially. Oil flows through the oil passage under pressure to each bore, successively, and the lifters have central transverse passages 22 to permit such flow.

In the preferred embodiment of the engine 14, a flat, generally omega-shaped, anti-rotation member 24 is received within two adjacent bores 12a, 12b and additional members 24 are received in successive pairs of bores. These members are retained in the bores by the lifters and cooperate with the lifters to prevent relative rotation of the lifters in the bores while allowing reciprocation, thereby keeping rollers 26 of the lifters aligned with the actuating cams 27 of the cam shaft. The embodiment of the engine 14 as just described is of the general construction, described in U.S. Pat. No. 5,022,356 and entitled "Roller Valve Lifter with Anti-Rotation Member," the disclosure of which is incorporated herein by reference.

The lifters 10 are all identical in the embodiment shown. Each has a body 28 that has a major cylindrical part 28a and a minor planar part 28b that extends axially the full length of the body. The oil passage 20 in the block is cylindrical and of a diameter smaller than the diameter of the bores 12 and the bodies 28. The major cylindrical part of each body is large enough to obturate the oil passage 20. The transverse cylindrical passage 22 in the body is located entirely within the major cylindrical part 28a. The diameter of the passage 22 is of the same order of magnitude as the diameter of the oil passage 20. It is preferred that the passage 22 be so located in the lifter, and be of a diameter with respect to the oil passage 20 and the stroke of the lifter, that the passage 22 will always at least partially overlap the oil passage 20. A small bore 30 extends from the passage 22 to the exterior of the lifter to lubricate the bore 12 and a small bore 32 extends axially upward, communicating with a recess 34 that receives the lower end of a push rod 16, supplying oil under pressure to the push rod to lubricate a rocker arm of the valve operating mechanism (not shown).

In the preferred embodiment, a skirt 35 extends upwardly from the body 28 and surrounds the lower end of the pushrod 16. The skirt 35 is substantially flush with a top surface 48 of the engine block 14 when the lifter is fully retracted during reciprocation. The skirt 35 helps stabilize the lifter during reciprocation by providing more bearing surface for the lifter within the bore. Diametrically opposite holes 35a, 35b are formed within the skirt 35, as is a third hole 35c. These holes, displaced from each other 90° about the periphery, reduce the weight of the lifter, which is desirable from the standpoint of engine performance and efficiency. There is no hole opposite hole 35c because that area has the greatest need for the increased bearing surface. During lifter reciprocation, the lifter tends to rock toward and away from the member 24 because of the roller orientation, rather than side-to-side in the direction of the holes 35a, 35b. The holes 35a, 35b, 35c are located so they just clear the top surface 48 of the engine block 14 when the lifter is fully extended during reciprocation and thereby serve as drains for oil.

The roller 26 is carried in the lower end of the body 28, supported by a plane bearing or bushing 36 about a fixed axle or pin 38. The pin 38 is mounted within a pin receiving bore 39 located in a lower portion of the lifter body 28. In a current prototype, the bushing is made from Ampco 45, USN C-6300 while the axle is made from 52100 bearing steel. Both are hard, strong, wear-resistant materials. The central longitudinal axis of the axle 38 passes through the central longitudinal axis of the body 28 and is parallel to and below the transverse passage 22. The peripheral surface 26a of the roller 26 is cylindrical and of approximately the same width and is aligned with the planar portion 28b of the body. The roller is almost entirely received within a slot 40 of the body.

The planar portion 28b is as large as possible to provide enough surface to coact with a member 24, while yet maintaining sufficient cylindrical area 28a to keep the planar portion 28b from exposing the oil passage 20 and to keep it radially beyond the periphery of the roller, so the roller does not contact the member 24. The roller diameter and the diameter of the bores 12 are set by the engine manufacturer.

In the preferred embodiment, the member 24 for preventing rotation of the lifters 10 is generally omega-shaped with two parallel leg portions 42a, 42b connected and held in desired spaced-relation by a connecting portion 44. The leg portions terminate and transverse foot portions 46a, 46b, respectively. The length of the leg portions is substantially equal to or slightly greater than the axial length of the bores 12, so that the connecting portion rests on a top surface 48 of the engine block through which the bores 12 open, and the foot portions underlie a bottom surface 50 of the engine block that is substantially parallel to the surface 48 and through which the lower ends of the bores 12 open. The foot portions 46 each have a length transverse to the leg portions that is slightly smaller than the diameter of the bores 12.

Figure 2:
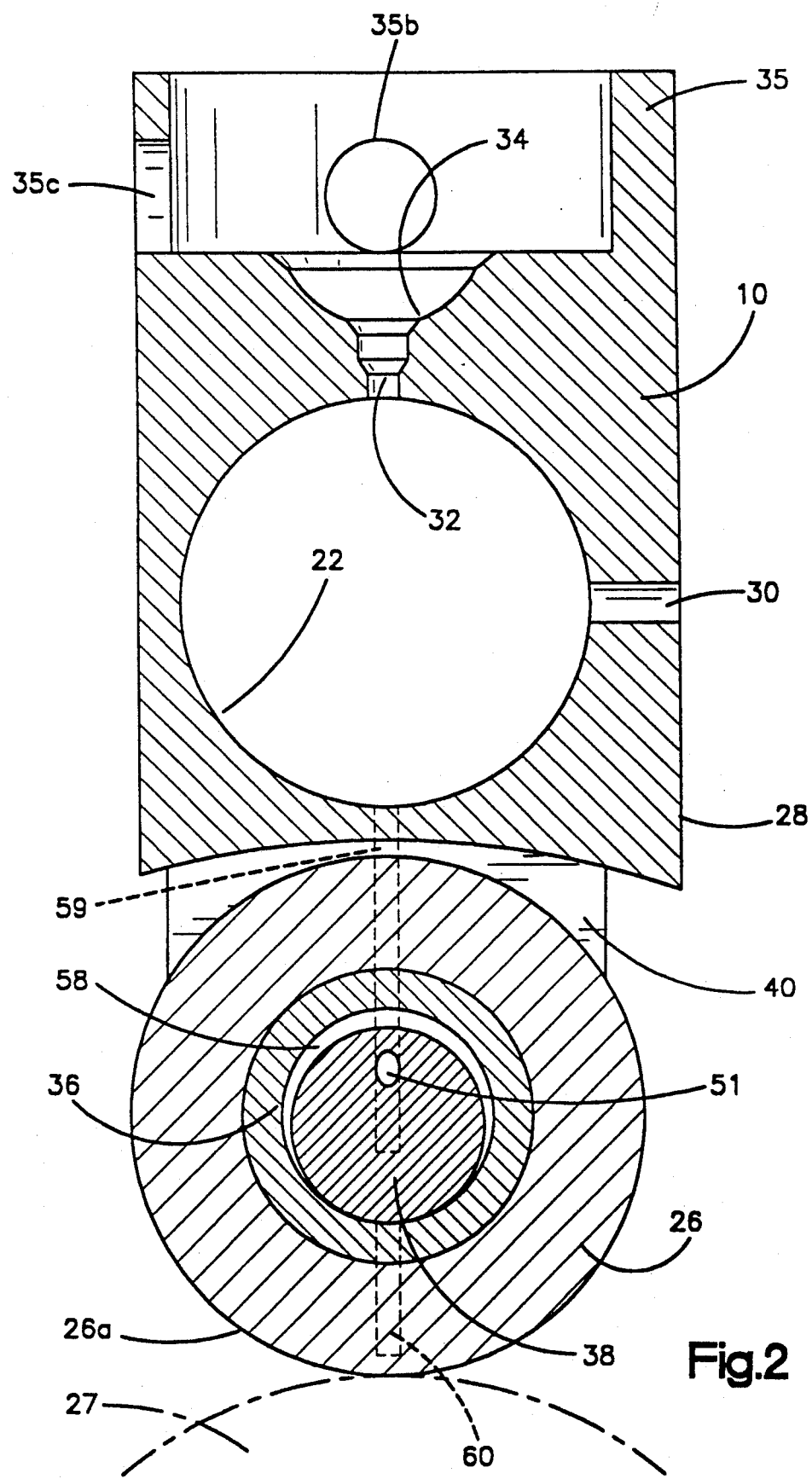
FIG. 2 is a longitudinal sectional view of a valve lifter taken along the line 2—2 of FIG. 1.
Figure 3:
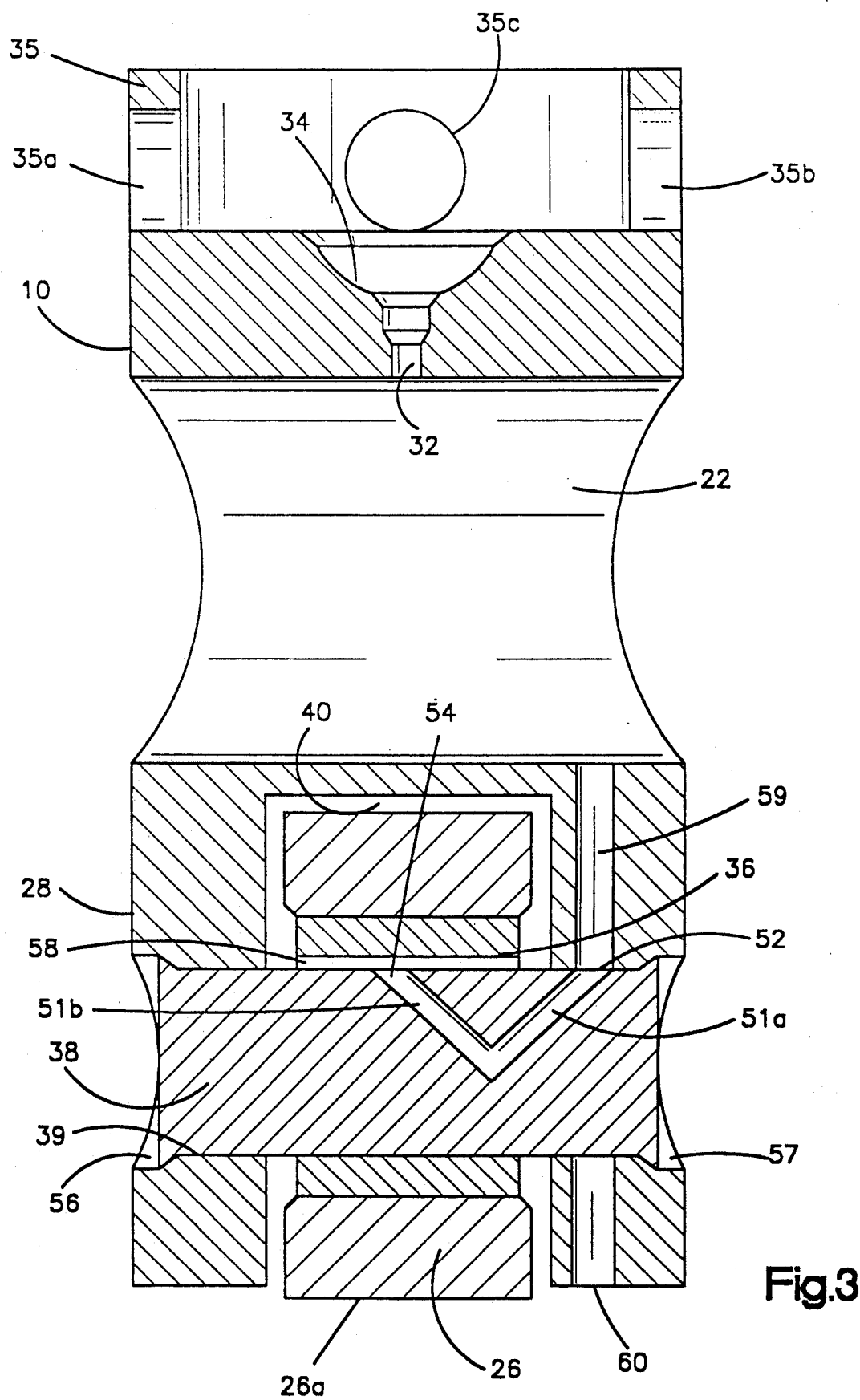
FIG. 3 is a longitudinal sectional view of the valve lifter taken along the line 3—3 of FIG. 1.

As best shown in FIG. 3, a lubrication oil passage 51 comprises two arms 51a, 51b and is located within the pin 38. In the preferred embodiment, an inlet 52 of the lubrication oil passage 51 and an outlet 54 of the lubrication oil passage face predominantly toward the primary oil passage 22. The inlet 52 is located in a portion of the pin 38 that is contained within the bore 39 located substantially adjacent one of two counterbores 56, 57 of the body 28 (the counterbore 57 in the embodiment shown). The outlet 54 is displaced longitudinally from the inlet 52 along the pin 38. The outlet is located in a cylindrical surface of the pin 38 in a portion of the pin that is surrounded by the roller 26 and a roller bushing 36. In the preferred embodiment, the inlet 52 and the outlet 54 of the lubrication oil passage 51 are both located in a common axial plane. As best seen in FIGS. 2 and 3, a slight clearance 58 is provided to allow free rotation of the roller and bushing about the pin and to receive lubricant. In a current prototype, the running clearance between the bushing and the pin is between 0.001 inch and 0.0015 inch.

The location of the clearance shown in FIGS. 2 and 3 represents the condition of the roller, bearing and pin when its associated cam is moving the lifter toward its extended position in the block, overcoming the high force of the heavy valve spring used in high speed automotive engines and opening the associate valve. During this phase of operation, the pressure on the bearing is greatest. At high engine speeds and with cams having a steep rise in contour, the impact between the cam and follower, and hence the wear and tear on the bearing, can be severe. To assure adequate flow of lubricant to the bearing, the outlet 54 is located substantially diametrically opposite the peripheral portion of the pin against which the cam force is most directly applied and, hence, where the clearance 58 between the pin 38 and bearing 36 will be the greatest at the time the greatest forces are applied. Because of the difficulty in drilling a lubrication oil passage in the hard metal of the pin 38, the passage 51 is made V-shaped, providing a continuous passage between the inlet 52 and outlet 54 by drilling only two relatively short holes that intersect centrally of the pin. The desired location of the pin 38 in the bore 39 is fixed by expanding the ends of the pin within the counterbores 56, 57, as by impact swaging, after the pin is properly placed within the bore 39.

Oil is delivered to the lubrication oil passage 51 from the primary oil passage 22 by means of a secondary oil passage 59 which extends in fluid communication between the primary oil passage 22 and the inlet 52 of the lubrication oil passage 51. As can be seen in FIGS. 2 and 3, the secondary oil passage parallels the central axis of the body 28. It is formed by drilling up through the body 28 to form the passage 60, and on through the bore 39 associated with the portion of the pin containing the inlet 52. To finish the secondary oil passage 59, drilling continues within the body 28 until the secondary oil passage 59 reaches the primary oil passage 22. By locating the passage 59 so it opens into the bore 39 in an axial plane of the pin that passes through the clearance 58 at its maximum dimension, the two arms 51a, 51b of the lubrication passage 51 can be located in a common plane, simplifying fabrication and assuring maximum flow of lubricant. Once the pin 38 is in place within the bore 39, oil is diverted from secondary oil passage 59 into lubrication oil passage 51 thereby negating any need to plug passage 60.

As is readily apparent, during operation of engine block 14, oil flows through the oil passage 20 under pressure to each bore, successively, and thereby through each primary oil passage 22 of each bore. Lubrication of the plane bearings 36 for the rollers 26 is provided by the lubrication oil passage 51 in each pin 38, which receives oil from the associated secondary oil passage 59.

With certain engine designs, the primary oil passage 22 is tangential to the bores 12 rather than central as shown. With such engine designs, the small bore 30 in the lifter is enlarged in diameter and communicates with a vertically oriented recess (not shown) on an outer surface of the lifter body 28 in order to maintain communication with the tangential primary oil passage during reciprocation of the lifter. Thus, oil can be supplied to the bearing lubrication passages from the tangential primary oil passage as opposed to the centrally located primary oil passage 22.

Thus, it will be appreciated from the foregoing that the bearing structure and lubrication system of the present valve lifter provides a strong and wear-resistant and hence long-lived construction especially useful in high speed automotive engines.

While a preferred embodiment of the invention has been disclosed in detail, it will be understood that various modifications or alterations can be made without departing from the spirit and scope of the invention set forth in the appended claims.

We claim:
1. For use in an internal combustion engine block used in a high speed motor vehicle having:
   open-ended cylindrical bores in which valve lifters reciprocate; a cam shaft with cams that reciprocate the lifters; and
   an engine block oil passage communicating between adjacent cylindrical bores intermediate the ends of the bores;
   an improved valve lifter for reciprocation within one of said bores comprising an elongated body having:
   a. a recess in one end;
   b. two pin-receiving apertures on opposite sides of the recess;

c. a cylindrical pin secured against rotation in said pin-receiving apertures and extending through the recess;

d. a roller cam follower rotatably supported in the recess on the pin;

e. a primary oil passage for communicating with the engine block oil passage to facilitate the flow of oil between said bores, said primary oil passage extending transversely of the body and displaced longitudinally of the body from the pin and roller cam follower;

f. a lubrication oil passage within the pin having:
  i. an inlet opening facing predominantly toward the primary oil passage and located in a portion of the pin that is in one of the pin-receiving apertures of said body; and
  ii. an outlet opening only facing predominantly toward the primary oil passage and displaced longitudinally of the pin from the inlet opening, the outlet being located in a cylindrical surface of the pin in a portion of the pin that is surrounded by the roller; and g. a secondary oil passage extending in fluid communication between said primary oil passage and the inlet opening of said lubrication oil passage.

2. The lifter of claim 1 wherein the inlet and outlet of the lubrication oil passage are located in a common axial plane.

3. For use in an internal combustion engine block used in a high speed motor vehicle having:

open-ended cylindrical bores in which valve lifters reciprocate;

a cam shaft with cams that reciprocate the lifters; and an engine block oil passage communicating between adjacent cylindrical bores intermediate the ends of the bores;

an improved valve lifter for reciprocation within one of said bores comprising an elongated body having:

a. a recess in one end;

b. two pin-receiving apertures on opposite sides of the recess;

c. a cylindrical pin secured against rotation in said pin-receiving apertures and extending through the recess;

d. a roller cam follower rotatably supported in the recess on the pin;

e. a primary oil passage for communicating with the engine block oil passage to facilitate the flow of oil between said bores, said primary oil passage extending transversely of the body and displaced longitudinally of the body from the pin and roller cam follower;

f. a lubrication oil passage within the pin having:
  i. an inlet opening located in a portion of the pin that is in one of the pin-receiving apertures of said body; and
  ii. outlet means only facing oppositely away from a line of contact between said roller cam follower and said pin during reciprocation of the lifter, and displaced longitudinally of the pin from the inlet opening, for discharging oil between the pin and roller; and g. a secondary oil passage extending in fluid communication between said primary oil passage and the inlet opening of said lubrication oil passage.

4. for use in an internal combustion engine block used in a high speed motor vehicle having:

open-ended cylindrical bores in which valve lifters reciprocate;

a cam shaft with cams that reciprocate the lifters; and an engine block oil passage communicating between adjacent cylindrical bores intermediate the ends of the bores and parallel to the cam shaft;

an improved valve lifter for reciprocation within one of said bores comprising an elongated body which is in major part cylindrical and in minor part non-cylindrical or of a different cylindrical curvature than the major part, the minor part extending parallel to the cylindrical axis of the major part the full axial length of the body and the major cylindrical part being of a size sufficient to obturate the block oil passage, the minor part cooperating with a member constructed and arranged to extend into the bore at a stationary location out of alignment with the oil passage and to engage the minor part to restrain rotation of the body about its axis without interfering with reciprocation, the body having:

a. a recess in one end;

b. two pin-receiving apertures on opposite sides of the recess;

c. a cylindrical pin secured against rotation in said pin-receiving apertures and extending through the recess;

d. a roller cam follower rotatably supported in the recess on the pin;

e. a primary oil passage for communicating with the engine block oil passage to facilitate the flow of oil between said bores, said primary oil passage extending transversely of the body and displaced longitudinally of the body from the pin and roller cam follower;

f. a lubrication oil passage within the pin having:
  i. an inlet opening facing predominantly toward the primary oil passage and located in a portion of the pin that is in one of the pin-receiving apertures of said body; and
  ii. an outlet opening only facing predominantly toward the primary oil passage and displaced longitudinally of the pin from the inlet opening, the outlet being located in a cylindrical surface of the pin in a portion of the pin that is surrounded by the roller; and g. a secondary oil passage extending in fluid communication between said primary oil passage and the inlet opening of said lubrication oil passage.

5. The lifter of claim 4 wherein the inlet and outlet of the lubrication oil passage are located in a common axial plane.

6. For use in an internal combustion engine block used in a high speed motor vehicle having:

open-ended cylindrical bores in which valve lifters reciprocate;

a cam shaft with cams that reciprocate the lifters; and an engine block oil passage communicating between adjacent cylindrical bores intermediate the ends of the bores;

an improved valve lifter for reciprocation within one of said bores comprising:

a. an elongated body having a recess;

b. a generally cylindrical pin secured against rotation within the recess and having an axis transverse to a center line of the body;

c. a roller cam follower rotatably supported by the pin;

d. a primary oil passage defined by the body which communicates with the engine block oil passage;

e. a lubrication oil passage within the pin having an inlet and an outlet only located within a segment of the pin that faces generally toward the primary oil passage; and f. a secondary oil passage located between the primary oil passage and the roller cam follower, the secondary oil passage having an inlet in fluid communication with the primary oil passage and an outlet in fluid communication with the lubrication oil passage.

7. The lifter of claim 6 wherein the inlet and outlet of the lubrication oil passage are located in a common axial plane.

* * * * *